United States Patent
Ayabe

(10) Patent No.: US 7,631,927 B2
(45) Date of Patent: Dec. 15, 2009

(54) CANOPY OF WORKING VEHICLE

(75) Inventor: Hiroaki Ayabe, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 54 days.

(21) Appl. No.: 11/574,229

(22) PCT Filed: Sep. 14, 2004

(86) PCT No.: PCT/JP2004/013372

§ 371 (c)(1),
(2), (4) Date: Sep. 18, 2007

(87) PCT Pub. No.: WO2006/022033

PCT Pub. Date: Mar. 2, 2006

(65) Prior Publication Data

US 2008/0007090 A1    Jan. 10, 2008

(30) Foreign Application Priority Data

Aug. 24, 2004   (JP)  ............................. 2004-244474

(51) Int. Cl.
*B62D 33/06* (2006.01)
(52) U.S. Cl. ................................. 296/190.08
(58) Field of Classification Search ............ 296/190.01, 296/190.03, 190.08, 102
See application file for complete search history.

(56) References Cited

U.S. PATENT DOCUMENTS

| | | | |
|---|---|---|---|
| 3,451,715 A | 6/1969 | Stuckenberger | |
| 5,036,942 A | 8/1991 | Loewen | |
| 5,086,869 A | 2/1992 | Newbery et al. | |
| 7,048,082 B2 * | 5/2006 | Mori et al. | ............... 180/89.12 |

FOREIGN PATENT DOCUMENTS

| | | |
|---|---|---|
| EP | 0 472 236 A2 | 2/1992 |
| FR | 2 261 164 | 9/1975 |
| GB | 1 561 940 | 3/1980 |
| JP | 09-158253 | 6/1997 |
| JP | 2001-200552 | 7/2001 |
| JP | 2001200552 A * | 7/2001 |
| JP | 2002-347666 | 12/2002 |
| JP | 2004-42740 | 2/2004 |
| JP | 2004-161114 | 6/2004 |

OTHER PUBLICATIONS

Supplementary European Search Report for International Application No. EP 04 77 3045, dated Dec. 11, 2007, 2 pgs.
International Search Report for International Application Serial No. PCT/JP2004/13372, mailed Nov. 16, 2004.

* cited by examiner

*Primary Examiner*—Dennis H Pedder
*Assistant Examiner*—Pinel E Romain
(74) *Attorney, Agent, or Firm*—Sterne, Kessler, Goldstein & Fox P.L.L.C.

(57) ABSTRACT

A canopy of a working vehicle has, therein, a forwardly and reversely rotatable seat and enables an increase in the rigidity of a canopy frame with a low cost and simple structure. Frames forming the back part of the canopy are disposed radially from the rotating axis of the seat in the canopy in plan view and bent toward the inside of the canopy. The heights of the bent points of the frames are generally aligned with the height of the seat surface of the seat and disposed in the canopy.

15 Claims, 12 Drawing Sheets

CANOPY OF WORKING VEHICLE

BACKGROUND OF THE INVENTION

1. Field of the Invention

The present invention relates to a structure of a canopy arranged in a working vehicle, more specifically, to a frame structure of the canopy having, therein, a rotatable seat.

2. Background Art

A work vehicle called a Backhoe Loader is conventionally known in which a front loader is attached to the front part of the tractor vehicle body, and a backhoe is attached to the back part (see e.g., patent document 1). In the backhoe loader, the operator's seat is disposed in a freely forward and backward reverse rotatable manner on the tractor vehicle body by way of a reverse rotation support device, where the operator's seat faces the front when the tractor is traveling or when using the front loader and the operator's seat faces the back when using the backhoe by the reverse rotation support device. The reverse rotation device of the operator's seat is configured by parallel links and a turntable. A ROPS (Roll Over Protective Structure) frame, which is a safety frame, is arranged in the vicinity of the operator's seat. The ROPS frame protects the operator from the front, back, left, right and above the operator's seat.

[Patent document 1] Japanese Laid-Open Patent Publication No. 5-229377

However, in the tractor disclosed in patent document 1, the space between the operator's seat and the safety frame is narrow, and thus is troublesome when the operator reverses the operator's seat and again sits on the operator's seat. The workability when reverse rotating the operator's seat is thus low. In particular, in the tractor in which the canopy is formed around the operator's seat, the knee tends to hit the canopy frame and the operator must adjust oneself when rotating the operator's seat while sitting thereon in rotating the operator's seat to reverse rotate the same.

The object of the present invention is to form the operator's seat to be reversely rotated in the working vehicle including the canopy, and to reduce the labor of the operator in reverse rotating the operator's seat by the shape of the safety frame of the canopy.

BRIEF SUMMARY OF THE INVENTION

The present invention relates to a canopy of a working vehicle having, therein, a rotatable seat; where the support columns of the frames forming the back part of the canopy include a portion extending towards the rotating axis of the seat in the canopy in plan view.

In the present invention, the support columns of the frames are bent toward the inside of the canopy, the portion lower than the bent point is the portion extending towards the rotating axis of the seat in the canopy in plan view, and the heights of the bent point of the frames are generally aligned with the height of the seat surface of the seat disposed in the canopy.

In the present invention, the frame forming the back part of the canopy is formed by connecting the upper ends of the support columns to a pipe for mounting a roof of the canopy, and the front ends of the pipes for mounting the roof is connected by way of a three directional pipe joint with respect to the support column of the front part of the canopy and a plurality of pipes forming a roof mounting part to form a canopy frame.

In the present invention, the three directional pipe joint is formed by casting.

In the present invention, a roof of the canopy is arranged on the three directional pipe joint, and a roof attachment seat of the canopy is integrally formed with the three directional pipe joint.

The present invention, the frame forming the back part of the canopy is formed by connecting the upper ends of the support columns to a pipe for mounting a roof of the canopy, the pipes for mounting the roof having a shape along a tangent line of a circumference having the rotating axis of the seat as the center.

In the present invention, an opening is formed at the upper end of the support column of the frame forming the back part of the canopy, and a harness is passed through the support column.

In the present invention, the frame forming the back part of the canopy is formed by connecting the upper ends of the support columns to a pipe for mounting a roof of the canopy, and a plurality of pipes having the same cross sectional shape is lined and bridged across the pipes to be mounted with the roof to serve as reinforcement members of the pipes for mounting the roof.

The present invention relates to a canopy of a working vehicle having, therein, a rotatable seat; where the support columns of the frames forming the back part of the canopy include a portion extending towards the rotating axis of the seat in the canopy in plan view, and thus the space in the canopy is enlarged, the operator is able to easily rotate the seat while sitting on the seat, and the strength of the canopy is increased.

In the present invention, the support columns of the frames are bent toward the inside of the canopy, the portion lower than the bent point is the portion extending towards the rotating axis of the seat in the canopy in plan view, and the heights of the bent point of the frames are generally aligned with the height of the seat surface of the seat disposed in the canopy, and thus the knee does not hit the frame while the operator is sitting on the seat, whereby the rotation of the seat is easily performed and the strength of the canopy is increased.

In the present invention, the frame forming the back part of the canopy is formed by connecting the upper ends of the support columns to a pipe for mounting a roof of the canopy, and the front ends of the pipes for mounting the roof is connected by way of a three directional pipe joint with respect to the support column of the front part of the canopy and a plurality of pipes forming a roof mounting part to form a canopy frame, and thus the number of components forming the frame of the canopy is reduced, assembly is facilitated, and the manufacturing cost is reduced.

In the present invention, the three directional pipe joint is formed by casting, and thus the number of components forming the frame of the canopy is reduced, assembly is facilitated, and the manufacturing cost is reduced.

In the present invention, a roof of the canopy is arranged on the three directional pipe joint, and a roof attachment seat of the canopy is integrally formed with the three directional pipe joint, and thus the number of components forming the frame of the canopy is reduced, and the aesthetic outer appearance of the canopy is improved.

In the present invention, the frame forming the back part of the canopy is formed by connecting the upper ends of the support columns to a pipe for mounting a roof of the canopy, the pipes for mounting the roof having a shape along a tangent line of a circumference having the rotating axis of the seat as the center, and thus the support columns are more easily radially disposed in the canopy, and the strength of the canopy is easily increased.

In the present invention, an opening is formed at the upper end of the support column of the frame forming the back part of the canopy, and a harness is passed through the support column, and thus the number of components configuring the canopy is reduced, a process of opening a hole for inserting the harness in the frame is unnecessary, and a good-looking canopy frame is formed with only a few number of steps.

In the present invention, the frame forming the back part of the canopy is formed by connecting the upper ends of the support columns to a pipe for mounting a roof of the canopy, and a plurality of pipes having the same cross sectional shape is lined and bridged across the pipes to be mounted with the roof to serve as reinforcement members of the pipes for mounting the roof, and thus the rigidity of the frame forming the canopy is increased without increasing the types of components.

BRIEF DESCRIPTION OF THE DRAWINGS/FIGURES

DETAILED DESCRIPTION OF THE INVENTION

Figure 1:
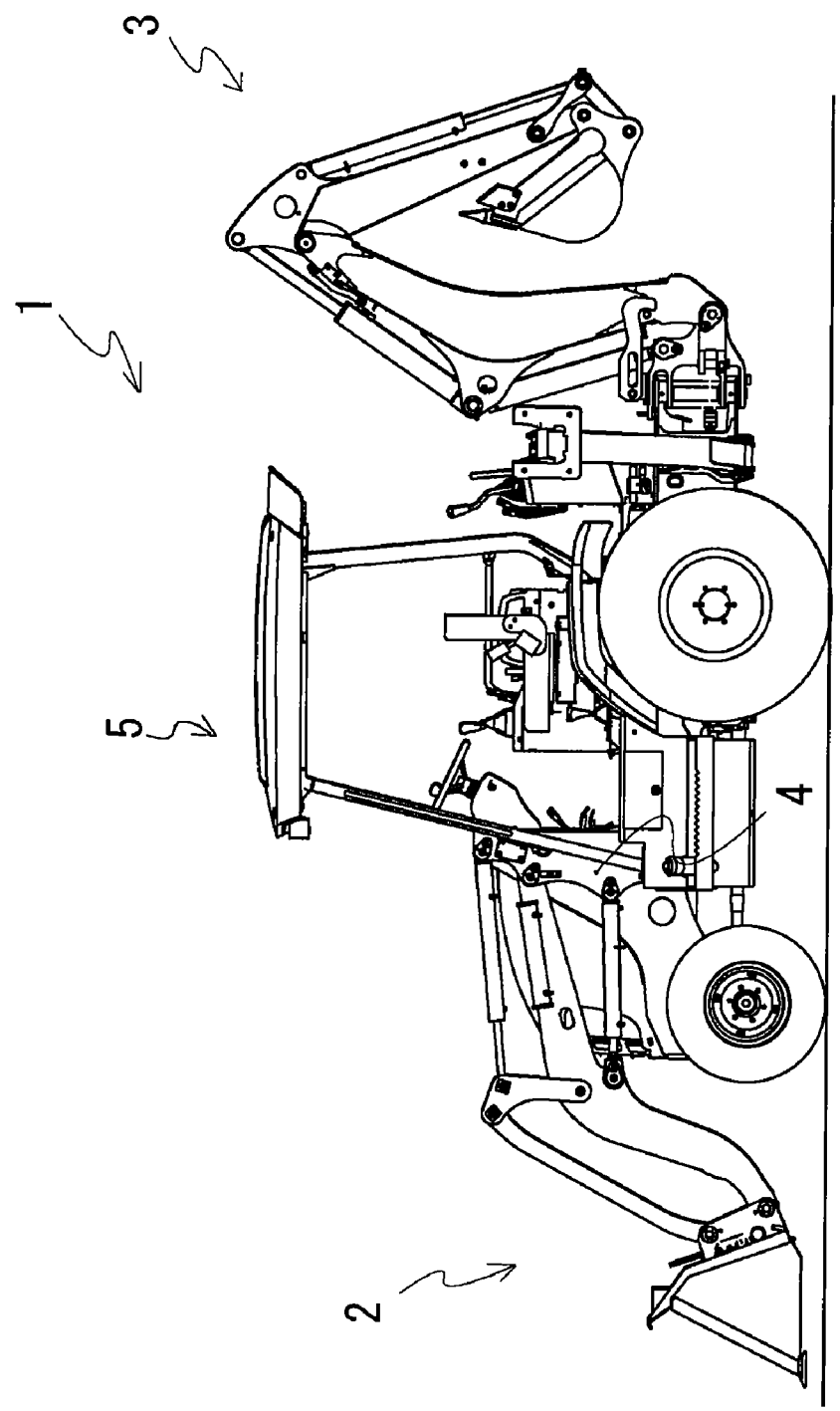
FIG. 1 is a side view of the entire backhoe loader including a canopy.

An example of the present invention will now be described using the figures. FIG. 1 is a side view of the entire backhoe loader including a canopy. The work vehicle 1 is a backhoe loader, where the loader 2 serving as a loading device and a drilling device 3 are attached to the work vehicle 1. A bracket 4 is arranged on both left and right sides of the bonnet of the work vehicle 1, which bracket 4 is fixed to the vehicle body frame of the work vehicle 1. A canopy 5 is arranged on the vehicle body frame, and the operator operates the work vehicle in the canopy 5.

Figure 2:
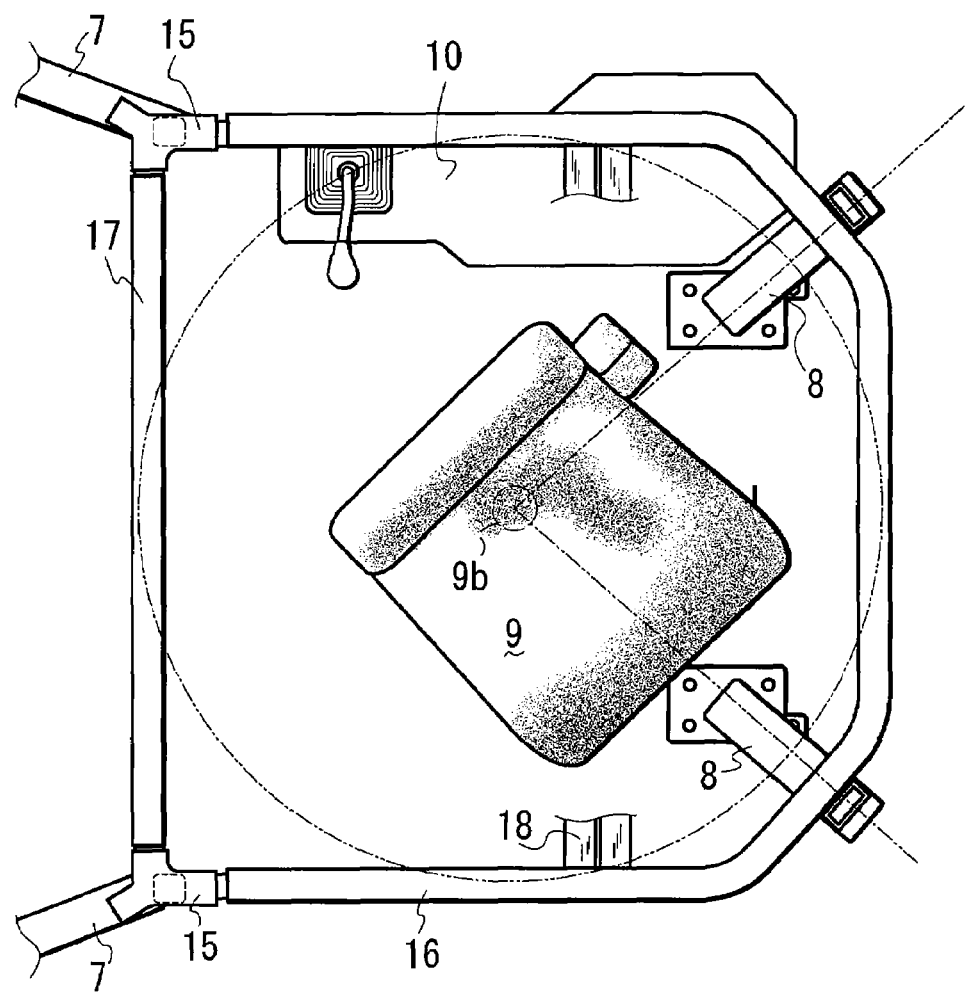
FIG. 2 is a plan view showing a frame structure of a canopy.
Figure 3:
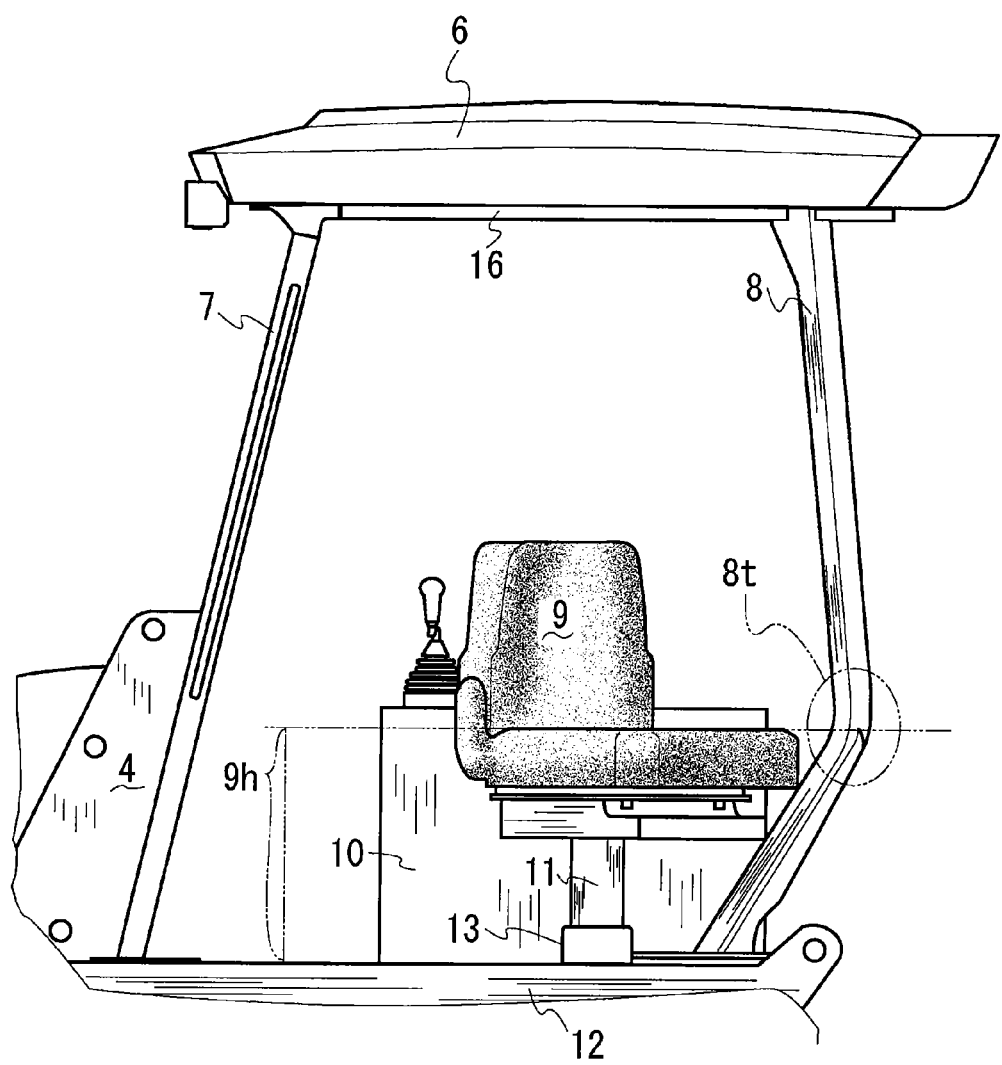
FIG. 3 is a side view showing a frame structure of a canopy.
Figure 4:
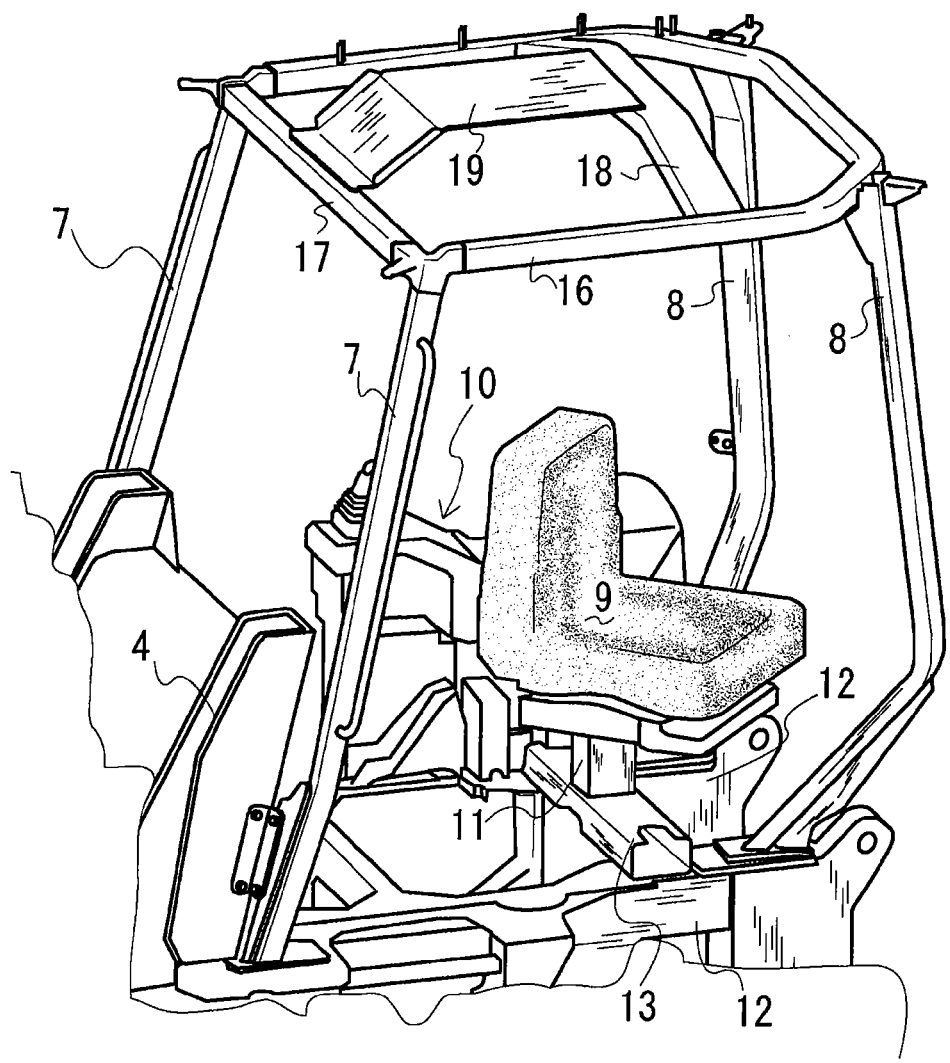
FIG. 4 is a perspective view showing a frame structure of a canopy.
Figure 5:
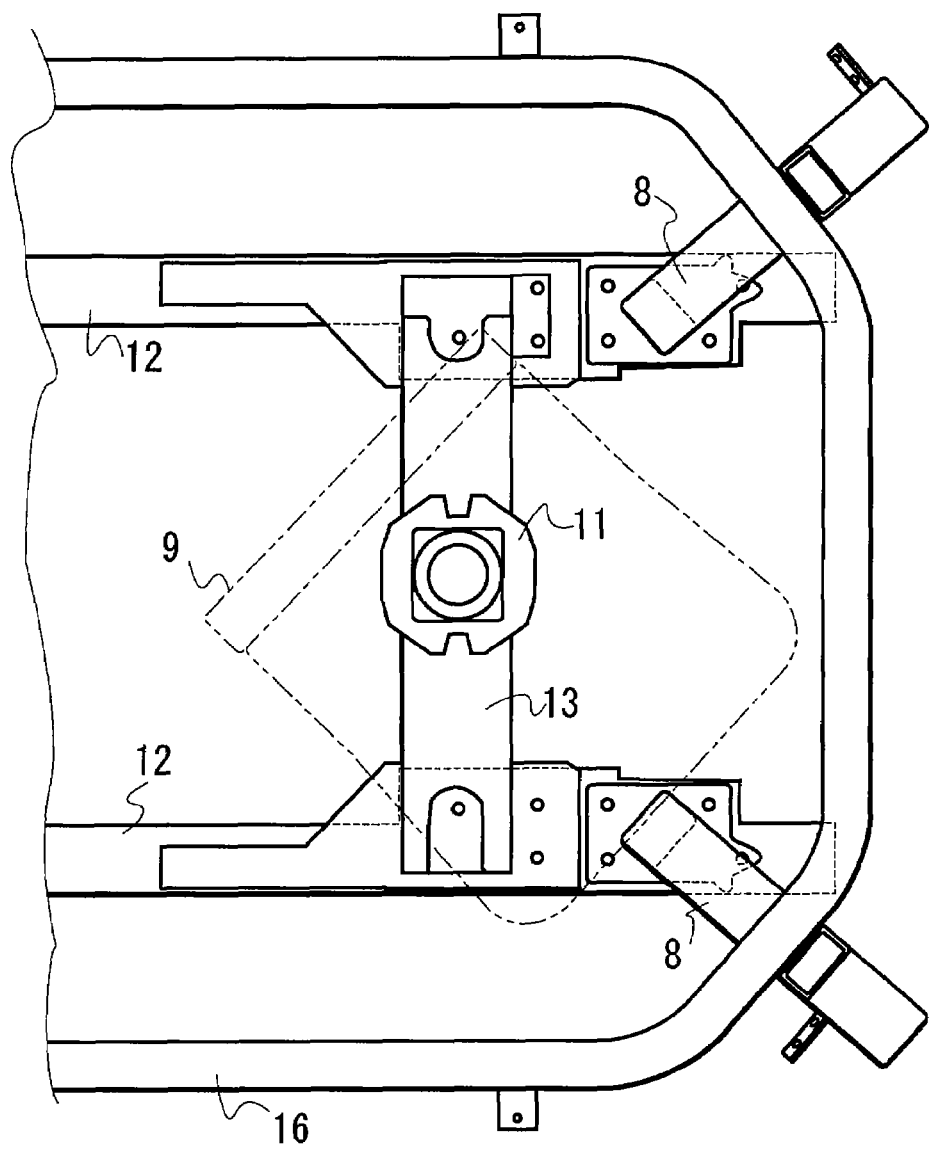
FIG. 5 is a plan view showing a structure of a top frame.

The structure of the frame configuring the canopy will now be described using FIGS. 2 to 4. FIG. 2 is a plan view showing the frame structure of the canopy, FIG. 3 is a side view of the same, FIG. 4 is a perspective view of the same, and FIG. 5 is a plan view showing the structure of the top frame. The canopy 5 is configured by front frames 7, rear frames 8, a top frame 16, and a front top frame 17. The front frame 7, the rear frame 8, the top frame 16, and the front top frame 17 are formed by square pipes, so that each frame is easily molded, and members are easily connected and arranged to each frame.

The front frames 7 and the rear frames 8 are respectively connected by the top frame 16 at the upper end. The top frame 16 is formed into a U-shape in plan view, and an opening is formed facing the front side, which the opening side of the top frame 16 is closed by bridging the front top frame 17. The front frames 7, the top frame 16 and the front top frame 17 are connected by two joints 15. A roof 6 is arranged on the top frame 16. A reinforcement frame 18 is arranged in the left and right direction at the center of the top frame 16, and a top plate 19 is arranged between the front top frame 17 and the reinforcement frame 18. The roof 6 is arranged on the top plate 19.

The canopy 5 is attached to the vehicle body frame 12 of the work vehicle, and the lower ends of the front frames 7 and the rear frames 8 are fixed to the vehicle body frame 12 arranged in the front and back direction of the work vehicle. A seat 9 on which the operator sits and the operation unit 10 of the work machine are arranged in the canopy 5, the seat 9 being positioned at approximately the center in the canopy 5. The operation unit 10 is positioned on the side of the seat 9. The operation unit 10 is attached to the vehicle body frame 12, and operation tools of the work machine such as an operation lever is arranged at the upper part of the operation unit 10. The seat 9 is arranged by way of a seat pillar 11 on a beam 13 bridged between the vehicle body frames 12 arranged on the left and the right. The seat pillar 11 is positioned on the shaft center of the rotation shaft 9b of the seat 9, the seat pillar 11 supporting the seat 9 in a freely rotatable manner. The operator rotates the seat 9 while sitting on the seat 9 and reversely rotates the seat 9 from the front towards the back or from the back towards the front.

The front frames 7 are arranged in the up and down direction at the front part of the canopy 5. The front frames 7 are arranged with the upper ends tilted towards the rear side, and the lower parts of the front frames 7 are also fixed to the bracket 4 for supporting the front loader of the work vehicle. The rear frames 8 are arranged in the up and down direction at the back part of the canopy 5. The rear frames 8 have a configuration having the lower parts extended diagonally upward towards the rear side at the back part of the canopy 5, bent to a dogleg shape and then extended diagonally slightly towards the front side from the direction of immediately above. The bent point 8t of the rear frame 8 has a structure approximately aligned with the height 9h of the seat surface of the seat 9, so that the foot space of the operator sitting on the seat 9 is ensured. Since the bent point 8t of the rear frame 8 is positioned at the height 9h of the seat surface of the seat 9, the bent point 8t most distant from the seat 9 in the rear frame 8 becomes equal to the position of the knee of the operator sitting on the seat 9. Thus, the rear frames 8 avoid the knee of the operator when the seat 9 is reversely rotated, thereby facilitating the reverse rotation while sitting on the seat 9.

The rear frame 8 has a square cross section when seen in plan view, the flat surface on the seat 9 side (side facing the seat) of the rear frame 8 is substantially orthogonal to the line connecting the rotating shaft 9b of the seat 9 and the rear frame 8, and the flat surface on the seat 9 side of the rear frame 8 is substantially parallel to the tangent line of a circle having the rotating shaft 9b as the center at the arrangement position of the rear frame 8. Therefore, the projection towards the seat 9 of the frame 8 is eliminated, and the operator is less likely to hit the frame 8 with his/her leg when reversely rotating the seat 9. The flat surface on the seat 9 side of the rear frame 8 is a flat surface in the longitudinal side in cross sectional view of the square pipe forming the rear frame 8, and thus resistance force in the front and back direction and left and right direction, and furthermore, in the twist direction is exhibited by arranging the rear frame 8. The foot space of the operator is ensured, the operator is able to rotate the seat 9 while sitting thereon, and the strength of the canopy 5 is increased since the frame 8 is radially arranged with the rotating shaft 9b of the seat 9 as the center in plan view. The rigidity is exhibited to the force in the traverse direction and the load in the front and back direction applied to the canopy 5 by arranging the rear frame 8 in the above manner. That is, if the frame 8 is configured standing at both rear corners, the frame for fixing the lower ends of the frames 8 must be extended to the rear side, and the strength in the left and right (or front and back) direction becomes inferior to the front and back (or left and right) direction. If the foot space is formed to be accommodated within the same left and right width, the space becomes narrower than in the present invention.

The top frame 16 is formed into a shape that lies substantially along the tangent line of the circumference of the rotation of the seat 9, and configures the surface facing the back, surfaces facing the left and the right, and the surface diagonally facing the rear side at the back part of the canopy 5. The rear frames 8 can be easily arranged radially from the rotating center of the seat 9, the connection between the rear frame 8 and the top frame 16 is facilitated, and the connection between the rear frames 8 and the top frame 16 is easily performed by configuring the top frame 16 in such a manner. The rear frame 8 is arranged radially with respect to the seat 9 in plan view, the concave side portion of the bent rear frame 8 is faced towards the seat 9, and the back part of the top frame 16 is formed into a circumferential shape that aligns with the rotating center of the seat 9, and thus the volume of the canopy 5 is increased, the distance between the frames is shortened, and a sufficient rigidity is provided to the canopy 5. That is, the canopy 5 can be miniaturized while enhancing the interior comfort of the canopy 5.

Figure 6:
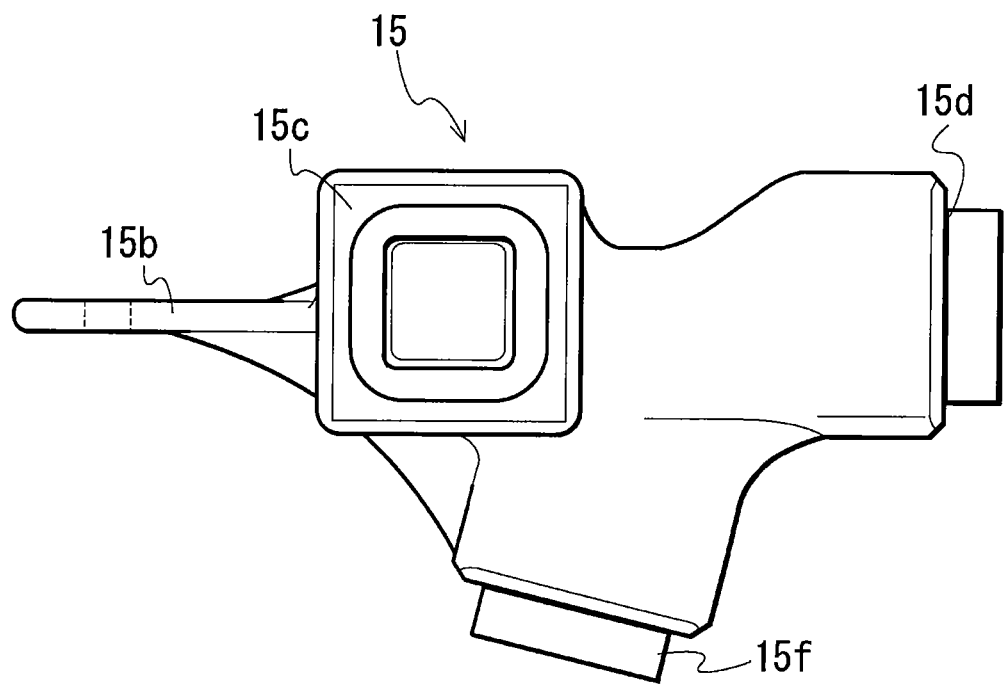
FIG. 6 is a side view of a joint arranged on the upper right part of the canopy.
Figure 7:
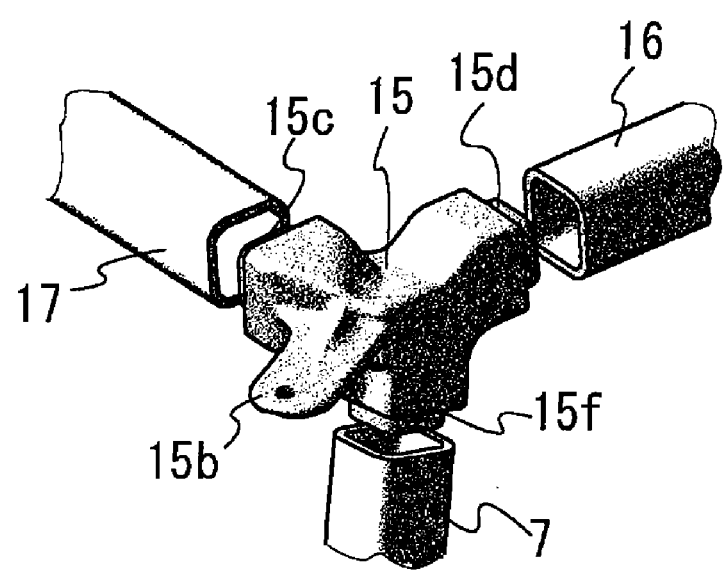
FIG. 7 is a perspective view of the joint arranged on the upper left part of the canopy.
Figure 8:
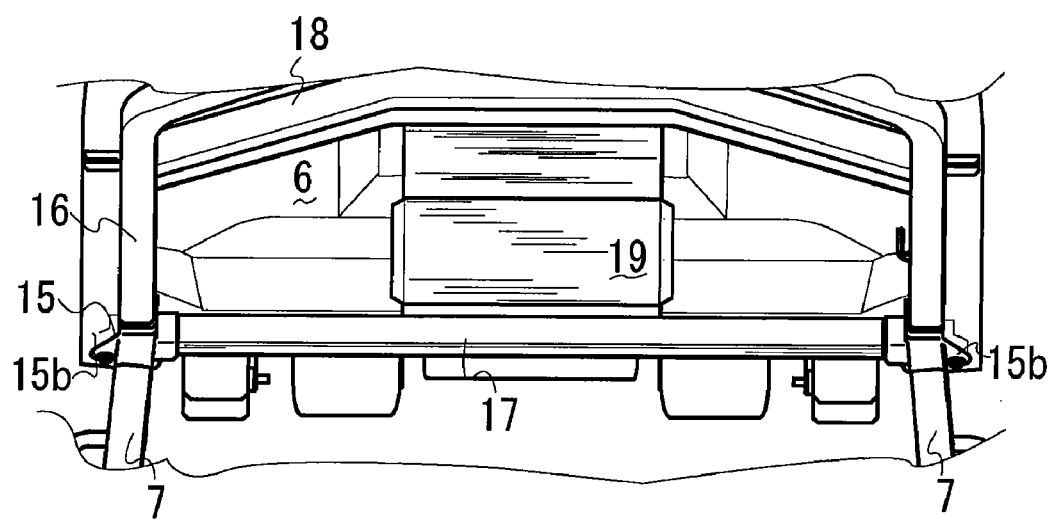
FIG. 8 is a view of a roof viewed diagonally from the rear side.
Figure 9:
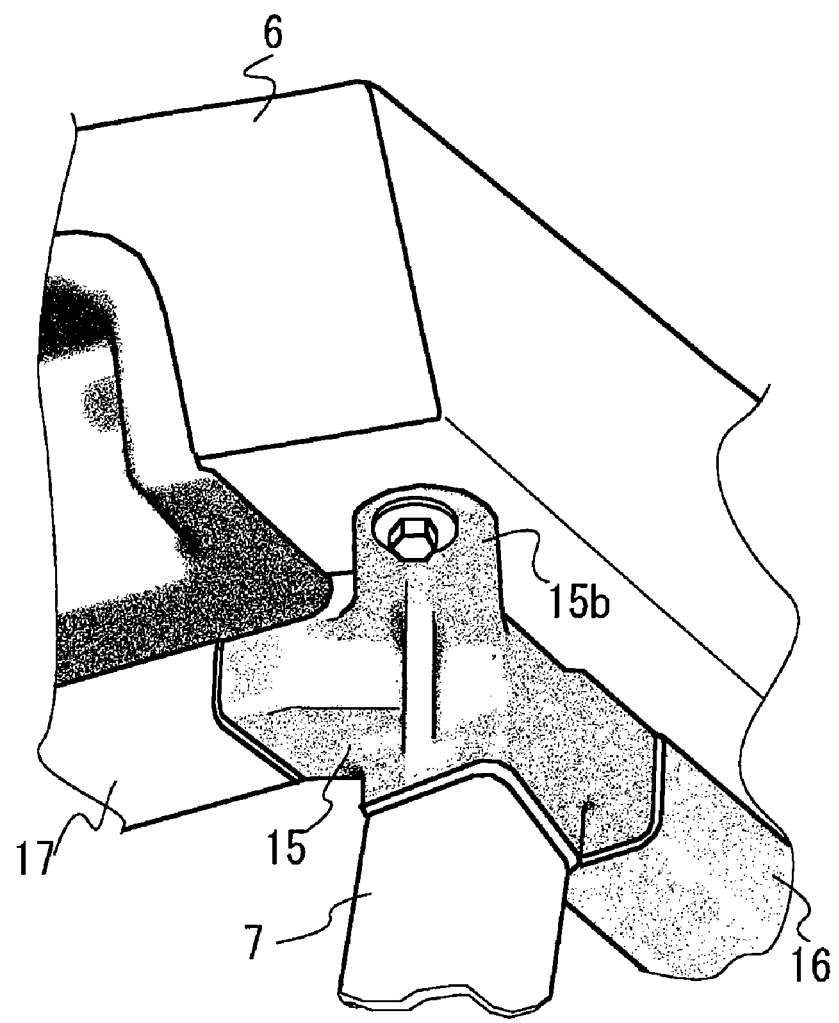
FIG. 9 is a perspective view viewed diagonally from the front side showing an attachment structure of the roof by the joint.

The configuration of the joint 15 will now be described. FIG. 6 is a side view of the joint arranged at the upper right part of the canopy, FIG. 7 is a perspective view of the joint arranged at the upper left part of the canopy, FIG. 8 is a view of the roof viewed diagonally from the rear side, and FIG. 9 is a perspective view viewed diagonally from the front side showing an attachment structure of the roof by the joint. The joint 15 is arranged to connect the frames extending in three directions at the upper front part of the canopy 5. The joint 15 connects the front frame 7, the top frame 16, and the front top frame 17. The upper end of the front frame 7, the front end of the top frame 16, and the side end of the front top frame 17 are connected to the joint 15. The joint 15 is configured by a lower connecting part 15f, a rear connecting part 15d, a traverse connecting part 15c and a stay 15b. The lower connecting part 15f is formed diagonally downward towards the front side, the rear connecting part 15d is formed towards the rear side, and the traverse connecting part 15c is formed towards the side. The stay 15b extends from the upper surface of the corner towards the front side in the horizontal direction as an attachment seat of the roof 6. The joint 15 is formed through casting, where fine angular adjustment in the joint 15 can be easily realized by cast. Thus, the frame of the canopy 5 can be assembled at high accuracy, and the manufacturing cost can be reduced.

The front frame 7 is connected to the lower connecting part 15f, the top frame 16 to the rear connecting part 15d, the front top frame 17 to the traverse connecting part 15c, and the front part of the roof 6 arranged on the top frame 16 is attached to the stay 15b. The joint 15 includes a three directional pipe joint, where a step portion is arranged at each of the lower connecting part 15f, the rear connecting part 15d, and the traverse connecting part 15c, which are the pipe joints. The pipe joint portion is formed so that the diameter (cross sectional area) on the distal end side is small, and the pipes configuring the frame of the canopy are attached to the distal end side. That is, the pipe joint portion has a shape that complies with the inner shape of the pipe shaped frame of the canopy. Thus, the connection of the frames is easily performed by fitting the pipes configuring the frame to the lower connecting part 15f, the rear connecting part 15d and the traverse connecting part 15c. The structure of the connecting part of each frame can be simplified by forming the coupling portions of the pipes to be coupled at a complex angle with the joint 15, or the molded article. Manufacturing is thus easily realized with reduced number of components of welded structure and reduced labor for positioning at the time of welding, and enhanced assembly of the canopy The roof 6 is arranged on the joint 15, and the front part of the roof 6 is fixed by the stay 15b of the joint 15. The stay 15b extends horizontally towards the outward front side in the diagonal direction from the joint 15. A hole opened in the up and down direction is formed in the stay 15b, where a bolt is inserted and fitted to the hole to fix the roof 6 to the joint 15. The number of components configuring the canopy 5 are reduced, the portion to be welding is reduced and the assembly is enhanced since the roof 6 is attached by means of the stay 15b integrally formed with the joint 15 for connecting the frames configuring the canopy 5. The aesthetic appearance of the canopy 5 is thereby also enhanced. In terms of workability, the vision in the canopy 5 is less likely to be inhibited by the joint 15, and a satisfactory vision is ensured since the sites that project downward are reduced at the joint 15 disposed at the upper front part of the canopy 5.

Figure 10:
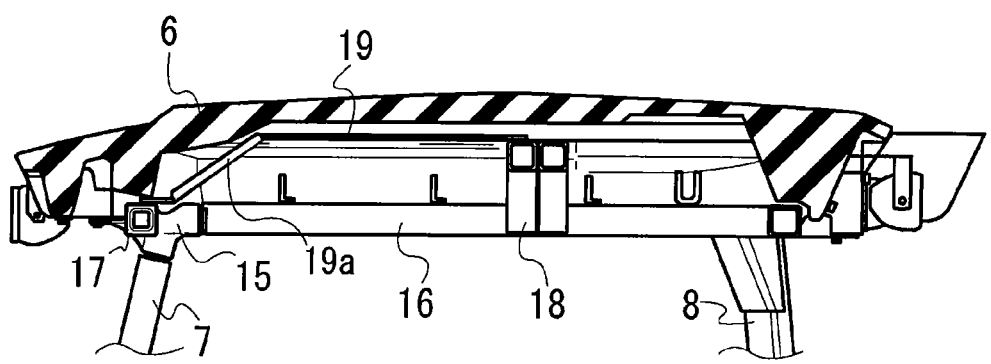
FIG. 10 is a cross sectional side view of the roof.
Figure 11:
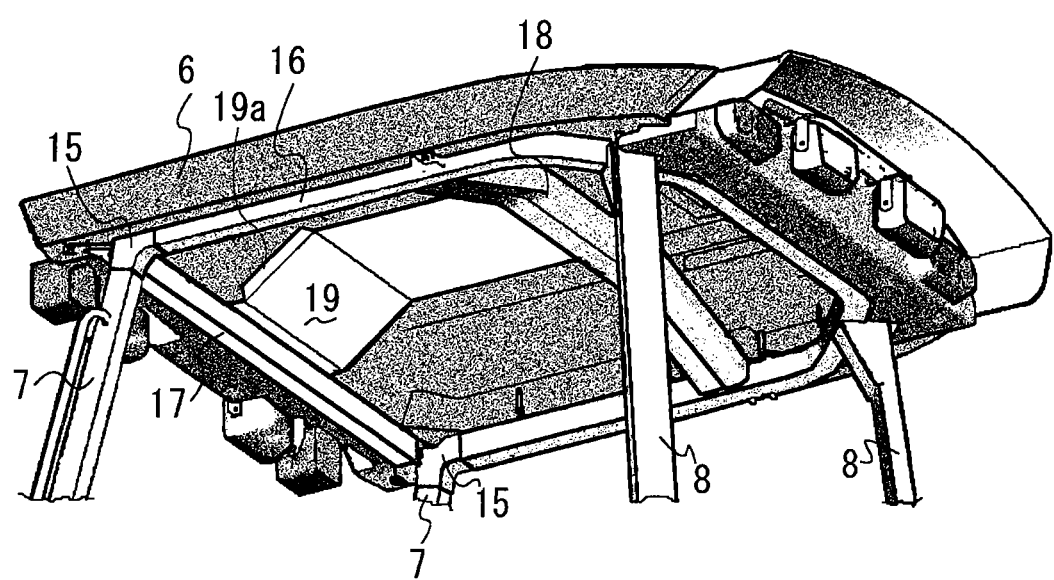
FIG. 11 is a perspective view showing the structure of the lower surface of the roof.

The configuration of the roof 6 will now be described. FIG. 10 is a cross sectional side view of the roof and FIG. 11 is a perspective view showing the structure of the lower surface of the roof. The roof 6 is arranged on the frame of the canopy 5. The roof 6 forms a concave part having the lower side opened at the center of the lower surface, and the top frame 16 and the front top frame 17 are arranged along the inner side of the periphery of the roof 6. The reinforcement frame 18 bridged in the left and right direction is formed by lining two square pipes in the front and back direction at the middle in the front and back direction between left and right top frames 16, and the two pipes are coupled to each other through welding. The reinforcement frame 18 is welded and fixed to the top frame 16 at both ends. The square pipe configuring the reinforcement frame 18 is the same square pipe configuring the top frame 16, and thus dimensional adjustment in time of connection is easily performed. Thus, the frame of the upper part of the canopy 5 is inexpensively reinforced, and the rigidity of the structure can be enhanced without increasing the type of constituting members.

The reinforcement frame 18 has an arch shape projecting upward from the top frame 16 at the middle in the left and right direction, where the upper surface at the middle part in the left and right direction of the reinforcement frame 18 and the upper surface at the middle part in the left and right direction of the of the front top frame 17 are connected by a top plate 19, thus also contributing to reinforcement.

Figure 12:
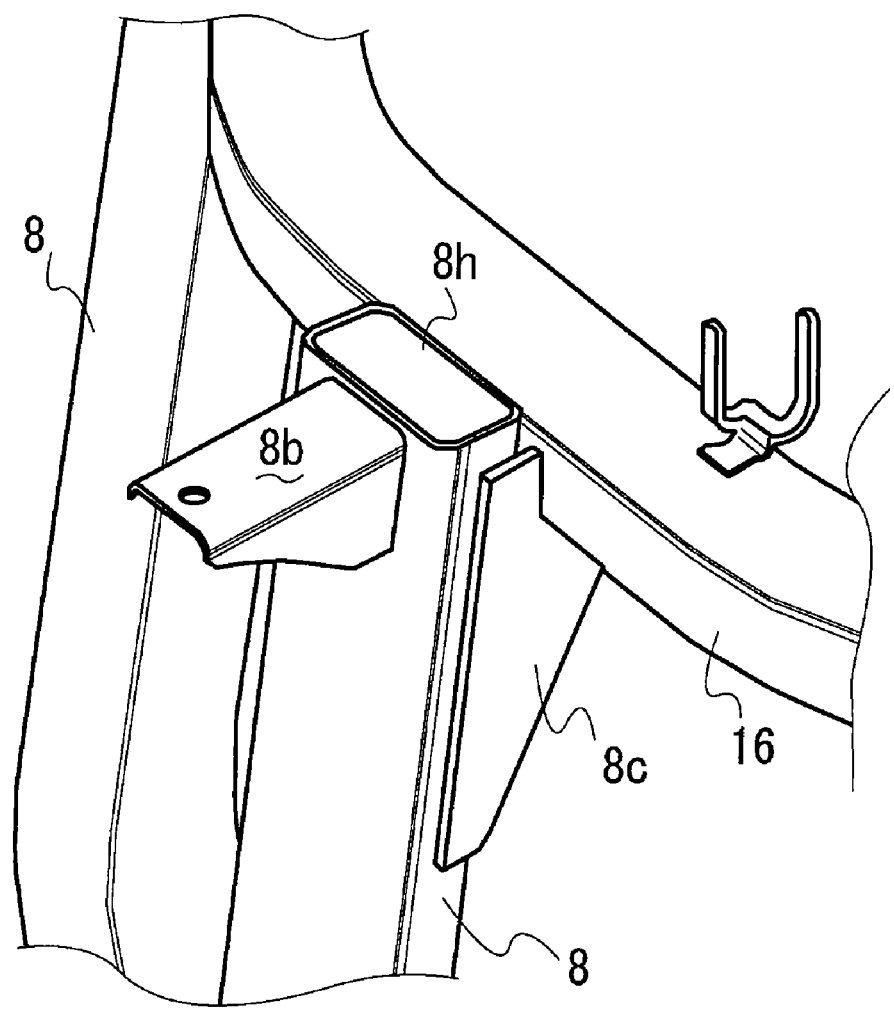
FIG. 12 is a view showing an opening of the rear frame.

The attachment of the harness in the rear frame 8 will now be described. FIG. 12 is a view showing an opening of the rear frame. The top frame 16 has a polygonal shape similar to the circumference having the rotating axis of the seat 9 as the center, and the rear frame 8 is fixed to the outer surface of the top frame 16 through welding. A bracket 8c is attached to the rear frame 8, thereby increasing the rigidity of the connection with the top frame 16. A stay 8b diagonally extending to the rear side is attached to the upper end of the rear frame 8. The back part of the roof 6 is fixed by the stay 8b. That is, the roof 6 is fixed to the frame of the canopy 5 configuring the safety frame, thereby reducing oscillation of the roof 6 and improving silence in traveling. The upper end of the rear frame 8 is opened upward, and the wirings of electrical components such as illumination arranged at the upper part of the canopy 5 are passed to the rear frame 8 through the opening on the upper end. Thus, the harness is protected by the rear frame 8, a process of opening a hole for passing the harness in the upper part of the rear frame 8 is not necessary, fixation along the frame is not necessary, and a frame of satisfactory appearance is realized with a small number of processing. In configuring the canopy 5, the upper end of the rear frame 8 is fixed through welding to the outer surface at a position coinciding with the upper surface of the top frame 16, and thus the contacting surface of the rear frame and the top frame is large, whereby the rigidity of connection is high, the dimension error in assembling the frame is absorbed in the connection of the frame 16 and the rear frame 8, and the labor required in manufacturing is reduced.

What is claimed is:

1. A working vehicle comprising:
   a canopy comprising:
   a pair of right and left front support columns;
   a rear support column;
   a top frame for mounting a roof thereon, the top frame including a laterally extended front pipe, a rear pipe, and a pair of right and left three directional pipe joints;
   wherein the rear pipe is substantially bent in a U-shape in plan view to have a fore-and-aft extended right portion, a fore-and-aft extended left portion, and a rear portion laterally extended between rear ends of the respective right and left portions such that the right and left portions are substantially perpendicular to the rear portion;
   wherein the rear support column is connected at a top end thereof to a portion of the rear pipe of the top frame between the right or left portion and the rear portion;
   wherein the right three directional pipe joint is connected to a front end of the right portion of the rear pipe of the top frame, the left three directional pipe joint is connected to a front end of the left portion of the rear pipe of the top frame, and the front pipe of the top frame is interposed between the right and left three directional pipe joints so as to be laterally extended; and
   wherein the right front column is connected at a top end thereof to the right three directional pipe joint, and the left front column is connected at a top end thereof to the left three directional pipe joint; and
   a rotatable seat disposed within the canopy,
   wherein the rear support column has a bent point such that the rear support column is positioned farthest away from an axis of rotation of the rotatable seat at the bent point in plan view.

2. The working vehicle according to claim 1, wherein a height of the bent point of the rear support column is generally aligned with a height of a seat surface of the rotatable seat disposed in the canopy.

3. The working vehicle according to claim 1, wherein at least one of the left or right three directional pipe joints is formed by casting.

4. The working vehicle according to claim 1, wherein at least one of the right and left three directional pipe joints is formed integrally with a stay to which the roof mounted on the top frame is attached.

5. The working vehicle according to claim 3, wherein at least one of the right and left three directional pipe joints is formed integrally with a stay to which the roof mounted on the top frame is attached.

6. The working vehicle according to claim 1, wherein the top frame has a shape such that the front pipe and the right, left and rear portions of the rear pipe are arranged as tangent lines of a circumference having the axis of rotation of the rotatable seat as the center in plan view.

7. The working vehicle according to claim 1, wherein an opening is formed at an upper end of the rear support column and a harness is passed through the rear support column via the opening.

8. The working vehicle according to claim 1, wherein the top frame of the canopy further comprises:
   a plurality of reinforcement pipes having a same cross sectional shape, wherein the plurality of reinforcement pipes of the top frame are lined and bridged across the right and left portions of the rear pipe of the top frame so as to reinforce the top frame.

9. The working vehicle according to claim 1, wherein the right and left front support columns are substantially straight.

10. A working vehicle comprising:
    a canopy comprising:
    a front frame having a support column;
    a rear frame having a support column;
    a top frame arranged over the front and rear frames, the top frame including a plurality of pipes on which a roof is mounted; and
    a three directional pipe joint, wherein the three directional pipe joint joins the support column of the front frame and two of the plurality of pipes of the top frame, and wherein the three directional pipe joint is formed integrally with a stay to which the roof mounted on the plurality of pipes of the top frame is attached; and
    a rotatable seat disposed within the canopy,
    wherein the support column of the rear frame of the canopy has a bent point such that the support column of the rear frame is positioned farthest away from an axis of rotation of the rotatable seat at the bent point in plan view.

11. The working vehicle according to claim 10, wherein a height of the bent point of the support column of the rear frame is generally aligned with a height of a seat surface of the rotatable seat disposed in the canopy.

12. The working vehicle according to claim 10, wherein the stay is extended diagonally with respect to two of the plurality of pipes of the top frame.

13. The working vehicle according to claim 10, wherein the three directional pipe joint including the stay is formed by casting.

14. The working vehicle according to claim 10, wherein an opening is formed at an upper end of the support column of the rear frame, and a harness is passed through the support column of the rear frame via the opening.

15. The working vehicle according to claim 10, wherein a plurality of reinforcement pipes having a same cross sectional shape are lined and bridged across two of the plurality of pipes of the top frame.

* * * * *